(12) United States Patent
Mason

(10) Patent No.: US 7,467,680 B2
(45) Date of Patent: Dec. 23, 2008

(54) MOTOR VEHICLE HOOD WITH PEDESTRIAN PROTECTION

(75) Inventor: David Edward Mason, Bromley (GB)

(73) Assignee: Ford Global Technologies, LLC, Dearborn, MI (US)

(*) Notice: Subject to any disclaimer, the term of this patent is extended or adjusted under 35 U.S.C. 154(b) by 1057 days.

(21) Appl. No.: 10/249,136

(22) Filed: Mar. 18, 2003

(65) Prior Publication Data

US 2004/0182616 A1 Sep. 23, 2004

(51) Int. Cl.
 *B62D 25/10* (2006.01)
(52) U.S. Cl. ............ 180/69.2; 296/187.04; 296/187.09
(58) Field of Classification Search ........... 180/69.2, 180/69.21, 271, 274; 296/187.01, 187.03, 296/187.04, 187.09, 193.11, 193.09, 100.02, 296/100.03, 271, 274; 280/784; 293/100.03
See application file for complete search history.

(56) References Cited

U.S. PATENT DOCUMENTS

| | | | |
|---|---|---|---|
| 3,909,058 A | | 9/1975 | Kramer et al. |
| 4,348,442 A | | 9/1982 | Figge |
| 4,359,120 A | | 11/1982 | Schmidt et al. |
| 4,822,011 A | * | 4/1989 | Goldbach et al. .......... 267/201 |
| 4,906,508 A | * | 3/1990 | Blankenburg et al. ....... 428/116 |
| 5,115,878 A | * | 5/1992 | Hayata ..................... 180/69.21 |
| 5,124,191 A | | 6/1992 | Seksaria |
| 5,605,371 A | * | 2/1997 | Borchelt et al. ......... 296/187.09 |
| 5,706,908 A | | 1/1998 | Sakai et al. |
| 5,833,024 A | * | 11/1998 | Kaneko ..................... 180/69.2 |
| 5,988,305 A | * | 11/1999 | Sakai et al. ............. 296/187.04 |
| 6,179,364 B1 | * | 1/2001 | Takahashi ................... 296/76 |
| 6,398,286 B1 | | 6/2002 | Devin et al. |
| 6,641,209 B2 | * | 11/2003 | Warwel et al. ............. 180/69.2 |
| 6,749,254 B1 | * | 6/2004 | Kleven et al. ............... 296/191 |
| 6,793,275 B1 | * | 9/2004 | Chernoff et al. ....... 296/193.11 |
| 6,883,627 B1 | | 4/2005 | Staines et al. |

FOREIGN PATENT DOCUMENTS

| | | |
|---|---|---|
| DE | 19525289 | 3/1996 |
| DE | 19525289 A1 | 3/1996 |
| EP | 1093980 | 4/2001 |
| EP | 1093980 A1 | 4/2001 |
| EP | 1253068 | 10/2002 |
| EP | 1253068 A2 | 10/2002 |

* cited by examiner

*Primary Examiner*—Christopher Ellis
*Assistant Examiner*—Brian Swenson
(74) *Attorney, Agent, or Firm*—Gary Smith; Dickinson Wright PLLC

(57) ABSTRACT

A hood 7 is provided for an engine compartment of a motor vehicle including an outer skin 16 and reinforcing ribs 12 connected with the outer skin and imparting rigidity thereto. The ribs 12 have a channel portion 16 mainly formed in an equilateral hexagonal pattern.

16 Claims, 4 Drawing Sheets

MOTOR VEHICLE HOOD WITH PEDESTRIAN PROTECTION

BACKGROUND OF INVENTION

Field of the Invention

The field of the present invention is engine compartment hoods for automotive vehicles. As used herein, the term engine compartment hood refers to the front hood of an automotive vehicle whether or not the hood encloses a compartment wherein an engine is located.

Many car/pedestrian crashes involve the pedestrian being struck by the forward portion of the vehicle. In a pedestrian vehicle crash situation it is desirable that the pedestrian's contact with the hood of the vehicle be as "forgiving" as possible so as to minimize possible injury to the pedestrian. Counter to the mandate to minimize the force of impact, it is desirable to keep the deflation of the hood caused by impact to a minimum to protect the pedestrian's body from hitting a hard portion of the engine within the engine compartment.

Most vehicle hoods include a generally planar or curvilinear outer skin which is joined to a series of reinforcing ribs provided by a stamped metallic sheet of material. The reinforcing ribs are joined to the outer hood along the peripheral edges of the ribs and along certain portions of the ribs between the ribs peripheral edges.

Head impact criteria (sometimes referred to as head performance criterion) is measured by a spherical-like object which is impacted with the hood. The spherical like object has an accelerometer mounted therein. Head performance criterion (HPC) is calculated from the resultant of accelerometer time histories as the maximum (depending on t1 and t2) of the equation:

$$HPC = \left[\frac{1}{t_2 - t_1}\int_{t_1}^{t_2} a\, dt\right]^{2.5}(t_2 - t_1)$$

where 'a' is the resultant acceleration as a multiple of 'g' and t1 and t2 are the two time instants (expressed in seconds) during the impact, defining the beginning and the end of the recording for which the value of HPC is a maximum. Values of HPC for which the time interval (t1 t2) is greater than 15 ms are ignored for the purposes of calculating the maximum value. As a rule lower HPC values are better.

As mentioned previously, it is desirable that the hood be as forgiving as possible in crash situations. It is also desirable that while the hood is forgiving in crash situations, that the maximum deflection of the hood be minimized. It is further desirable that the hood has torsional rigidity.

It is also desirable that the above-noted features which are all affected by the structure of the reinforcing ribs be as predictable and uniform as possible so that overall hood height can be held to a minimum to maximize the aerodynamic properties of the vehicle.

SUMMARY OF INVENTION

To make manifest the above and other noted desires, a revelation of the present invention is brought forth. In a preferred embodiment the present invention provides an engine compartment hood with an outer skin. Connected with the outer skin and imparting rigidity thereto are a series of ribs having channel portions formed in a tessellated, generally equally-sized, equilateral hexagonal pattern. The hexagonal pattern aids in providing greater uniformity in the head impact criteria (HIC) of the hood along with uniformity in deformation caused by a predetermined impact. Due to the increased uniformity in head impact criteria and deformation, the height of the hood can be held at a minimum.

It will be apparent to those skilled in the art of other advantages of the present invention as the invention is further revealed in the drawings and detailed description.

DETAILED DESCRIPTION

Figure 1:
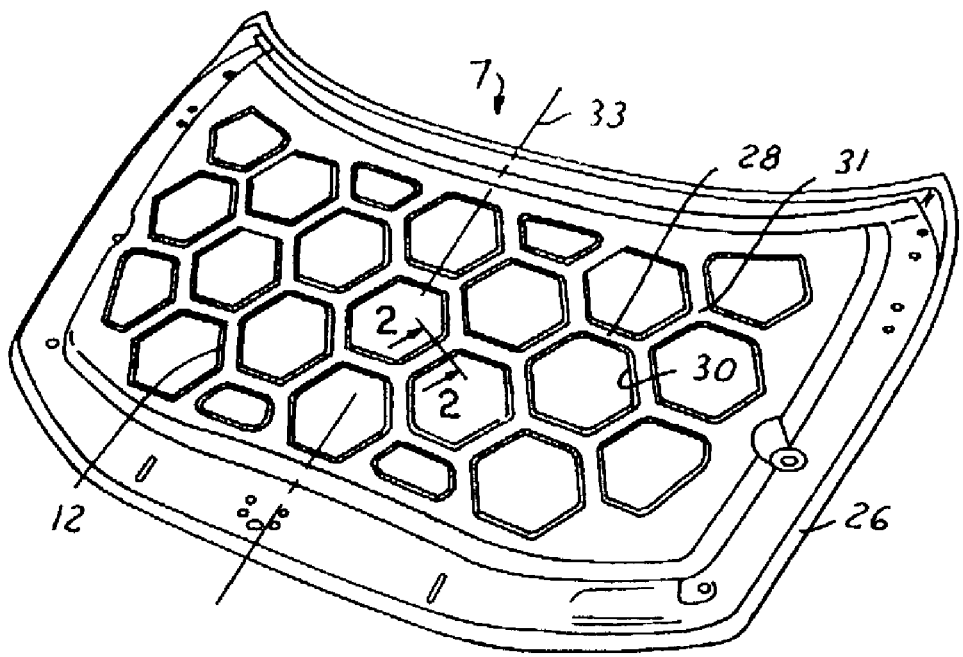
FIG. 1 is a perspective view of a preferred embodiment vehicle hood according to the present invention.
Figure 2:
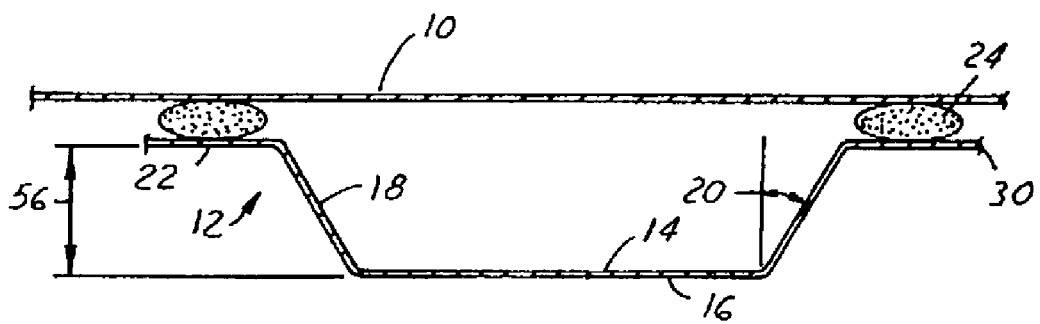
FIG. 2 is a schematic view taken along lines 2-2 of FIG. 1, illustrating a draft angle of the channel portion of the ribs shown in FIG. 1.

Referring to FIGS. 1 and 2, a vehicle hood 7 for an engine compartment of an automotive vehicle is provided. The hood includes a 1.0 mm thick aluminum outer skin 10. In other embodiments not shown, the skin can be fabricated from steel. Connected with the outer skin 10 are a series of reinforcing ribs 12, which are formed from 1.0 mm thick aluminum. The reinforcing ribs 12 have a cross-sectional shaped channel portion 14. The channel portion 14 has a valley 16. The valley 16 is joined by two side walls 18. The side walls 18 have a draft angle 20 with the valley 16 of approximately 30°. The side walls 18 are joined to plateaus 22.

The plateaus 22 can be selectively joined with the skin 10 by welding, sealer or adhesive 24. In many applications, the peripheral edge of the skin will be bent over to form a seam 26 which captures a peripheral boundary of the ribs 12. The ribs 12 are shaped to form polygonal tessellated, generally equally-sized hexagonal patterns 28 having cut outs 30 and three-legged intersections 31. The pattern 28 is generally symmetrical about a longitudinal centerline 33 of the hood.

Figure 3:
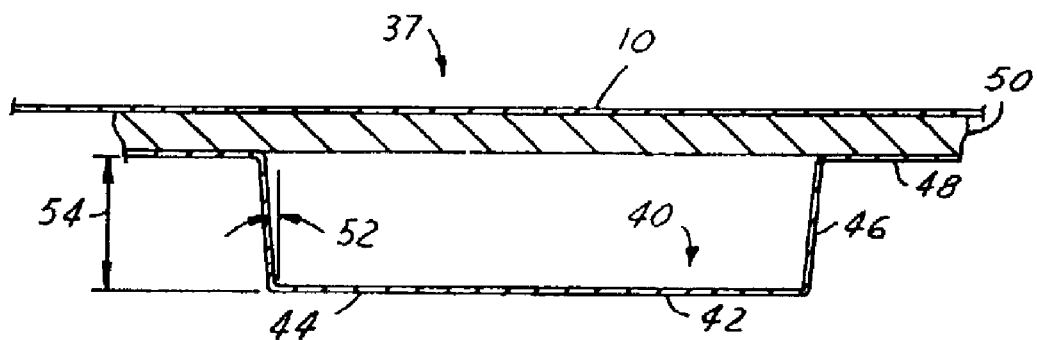
FIG. 3 is a schematic view illustrating a draft angle of the channel portion of the ribs of an alternate preferred embodiment hood according to the present invention.
Figure 4:
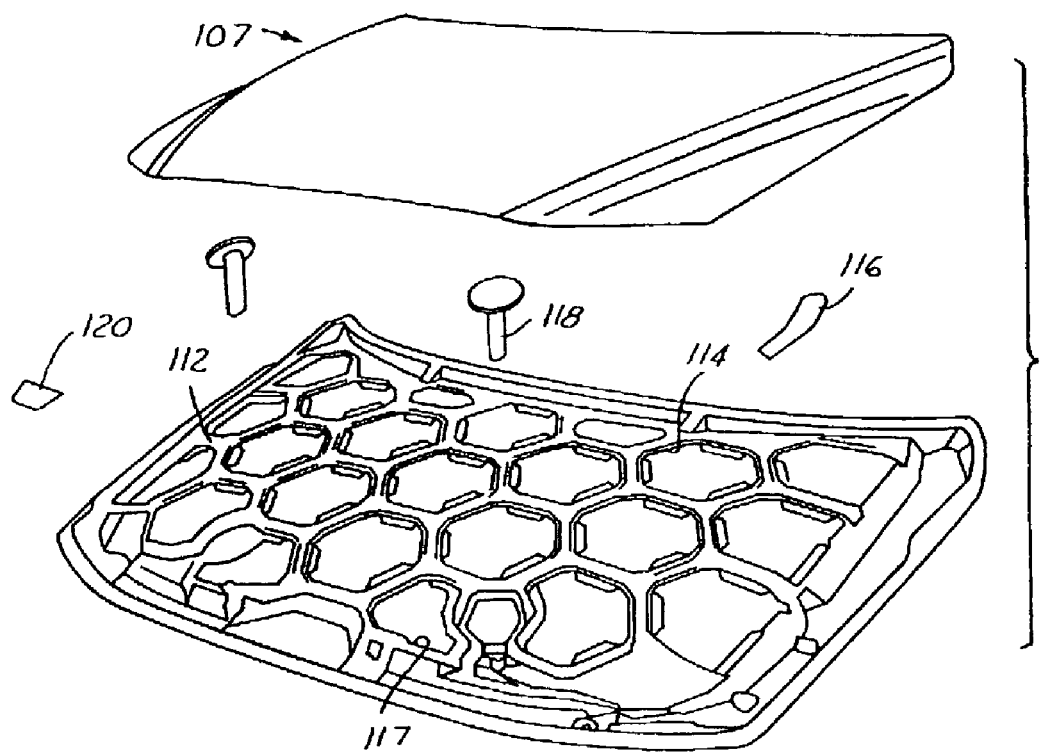
FIG. 4 is an exploded view of another alternate preferred embodiment vehicle hood according to the present invention.
Figure 5:
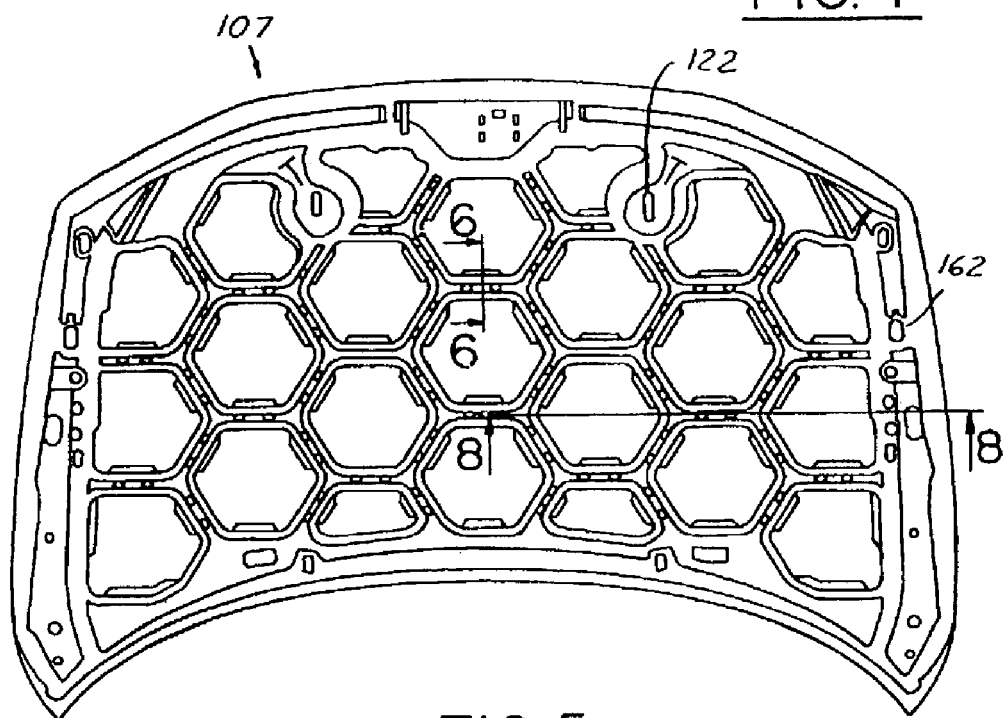
FIG. 5 is a bottom plan view of the reinforcing ribs utilized in the vehicle hood shown in FIG. 4.
Figure 9:
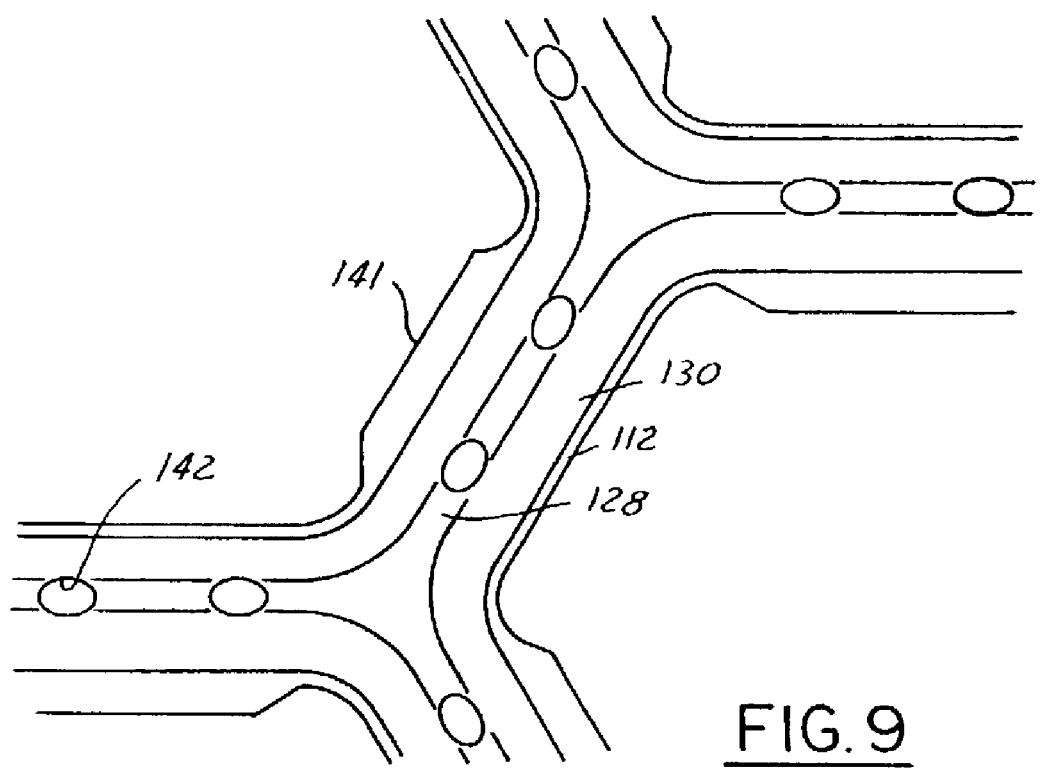
FIG. 9 is an enlargement of a portion of the hood shown in FIG. 5 illustrating slots formed in the reinforcing ribs shown in FIG. 5.

Referring to FIG. 3, a preferred embodiment hood 37 according to the present invention is provided. The hood 37 has a skin 10 similar or identical to the skin previously described for the hood 7. The ribs 40 have a channel portion 42 having a valley 44 with extending walls 46 with plateaus 48. Between the plateaus 48 and the skin 10 is a layer of installation material 50. The walls 46 have a draft angle 52 which is approximately 5°.

The height 54 of the walls 46 is approximately 10 cm versus the height 56 of the walls 18 (FIG. 2) which is approximately 15 mm. The difference in design is due to the fact that the ribs 40 are fabricated from steel and the ribs 12 are fabricated from aluminum.

Referring to FIGS. 4-9 an alternate preferred embodiment hood 107 is provided. The hood 107 has an outer skin 108. The hood 107 also has reinforcing ribs 112. The ribs 112 have a tessellated generally equally sized pattern in a shape having equilateral hexagonal cut outs 114. The ribs 112 are typically stamped from a single sheet of material. The hexagonal cut outs 114 as shown have a diameter of approximately 194 mm.

Figure 6:
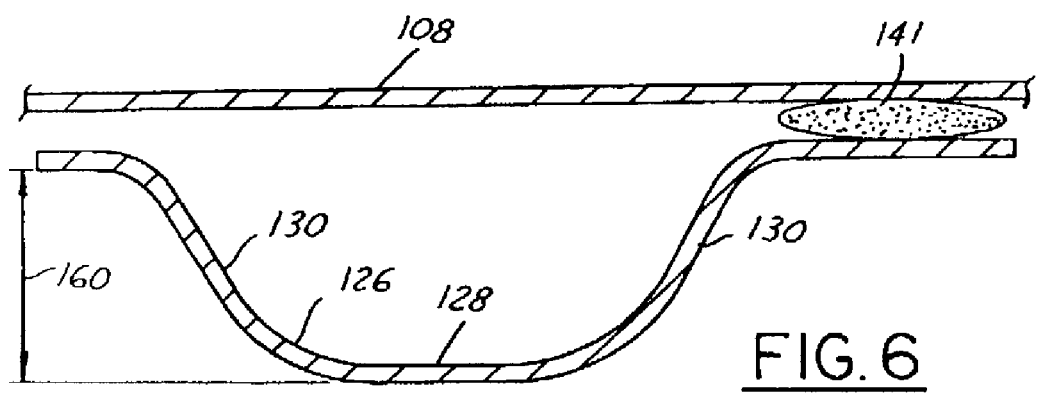
FIG. 6 is an inverted enlarged sectional view taken along lines 6-6 of FIG. 5.
Figure 7:
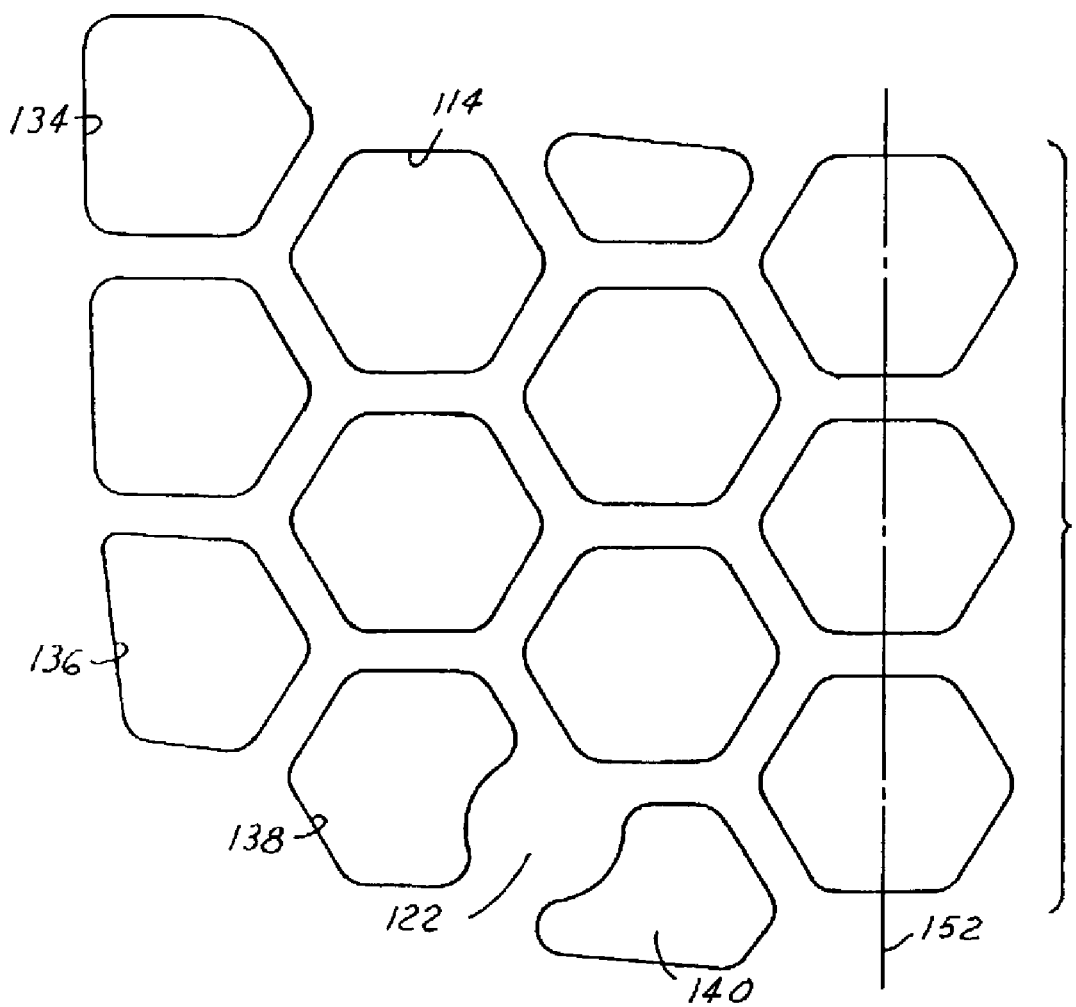
FIG. 7 is an enlargement of a portion of the reinforcing ribs utilized in the vehicle hood shown in FIG. 5.

Joined to the ribs 112 are hinge reinforcements 116 and hood striker, wires and reinforcements 118. Additionally, there is provided a hood safety release reinforcement 119. The striker is attached to the ribs 112 along location 122. Accordingly, the striker is positioned rearward of a forward edge 117 of the ribs reinforcements in order to improve adult upper leg impact performance. As best shown in FIG. 6, the ribs 112 have a channel portion 126 having a valley 128 with projecting side walls 130 which are connected with plateaus 132. At the peripheral edges of the sheet that forms the ribs, the partial equilateral hexagonal rib cutouts 134, 136, 138 and 140 are typically configured to have at least four sides.

Alternating plateaus 132 of the ribs 112 will be joined to the skin 108 by the utilization of adhesive strips 141. Accordingly, each rib 112 will have one plateau joined to the skin by an adhesive strip. Additionally, it has been found preferable from a performance standpoint, to provide the ribs valleys with similarly semi-oval shape punch outs 142.

Figure 8:
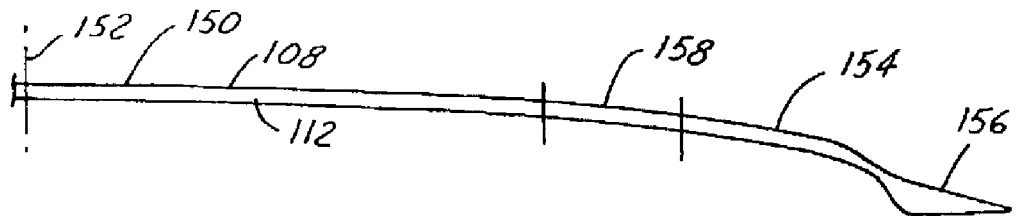
FIG. 8 is a side elevational view taken along line 8-8 of FIG. 5 illustrating differences in the heights of the ribs utilized in the hood of FIG. 1 in relationship to lateral distance to the centerline of the hood.

Referring to FIG. 8, the hood 107 has a central portion 150 which is closely adjacent a longitudinal centerline 152. The hood 107 also has an outer portion 154 which is adjacent a lateral perimeter of the hood. Between the central portion 150 and the outer portion 154 is a blend portion 158. In the central portion 150 the walls have a height 160 which are approximately 12.5 mm. Along the outer portion 154, the height of the walls 130 is approximately 10 mm. In the blend portion 158 the height of the walls 130 makes a transition from 12.5 to 10 mm. It has been found that this change of wall height yields a more homogeneous stiffness to the vehicle hood.

Experience has shown that the peripheral frame should be as narrow as possible. Along the frame, the ribs 112 can be joined to the skin by either having the skin being hemmed about the ribs or by utilization of a structural adhesive.

The present invention has been shown in several embodiments. However, it will be obvious to those skilled in the art of the various modifications which can be made to the present invention without departing from the spirit or scope of the invention as is defined in the accompanying claims.

The invention claimed is:

1. A hood for an engine compartment of a motor vehicle comprising:
    an outer skin; and
    reinforcing ribs connected with said outer skin and imparting rigidity thereto, said ribs having a channel portion with sidewalls and a valley, said valley being generally opposite said outer skin, said ribs being mainly formed in an equilateral hexagonal pattern and wherein an area between said ribs is cut out.

2. A hood as described in claim 1 wherein a peripheral portion of said hood has partial equilateral hexagonal shapes having four or more sides.

3. A hood as described in claim 2 wherein said hexagonal shapes are sized generally equal.

4. A hood as described in claim 1 wherein said ribs channel portions have a valley with side walls at an approximate 30° draft angle.

5. A hood as described in claim 1 wherein said ribs channel portions have a valley with side walls at an approximate 5° draft angle.

6. A hood as described in claim 1 wherein said reinforcing ribs are fabricated from steel.

7. A hood as described in claim 1 wherein said reinforcing ribs are fabricated from aluminum.

8. A hood as described in claim 1 wherein said reinforcing ribs are formed from a common stamping.

9. A hood as described in claim 1 wherein said ribs have side walls and plateaus symmetrical with respect to a centerline of said hood.

10. A hood as described in claim 1 wherein said ribs have side walls and plateaus and wherein alternating plateaus of said ribs are joined to said outer skin.

11. A hood as described in claim 1 wherein said ribs are joined to said outer skin by an adhesive material.

12. A hood as described in claim 1 wherein said hood in a first portion generally adjacent to a centerline of said hood has ribs with a first height and wherein there is a second portion of said hood generally adjacent to a lateral perimeter of said hood having ribs with a second height differing from said first height.

13. A hood as described in claim 12 wherein said first height is a greater height than said second height.

14. A hood as described in claim 13, wherein said hood has a third portion juxtaposed between said first and second portions wherein a height of said ribs is blended to the separate heights of said first and second portions.

15. A hood as described in claim 1 wherein the point of attachment of the hood latch to said ribs is rearward of a forward edge of said hood.

16. A hood for an engine compartment of a motor vehicle comprising:
    an outer skin;
    reinforcing ribs connected with said outer skin and imparting rigidity thereto, said ribs having a channel cross-sectional shape and being mainly formed in a tessellated common sized, hexagonal pattern having cut outs between said ribs, and said ribs adjacent to the perimeter of said hood having cut outs with at least four sides and wherein said ribs are symmetrical with a centerline of said hood.

* * * * *